(12) United States Patent
Gavade et al.

(10) Patent No.: US 9,930,408 B2
(45) Date of Patent: Mar. 27, 2018

(54) LIVE STREAMING CIRCULAR BUFFER

(75) Inventors: Sameer Vasant Gavade, Irving, TX (US); Venkata S. Adimatyam, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 361 days.

(21) Appl. No.: 13/455,164

(22) Filed: Apr. 25, 2012

(65) Prior Publication Data

US 2013/0290402 A1 Oct. 31, 2013

(51) Int. Cl.
*G06F 15/16* (2006.01)
*H04N 21/458* (2011.01)
*H04N 21/262* (2011.01)
*H04N 21/845* (2011.01)

(52) U.S. Cl.
CPC ... *H04N 21/4586* (2013.01); *H04N 21/26258* (2013.01); *H04N 21/8456* (2013.01)

(58) Field of Classification Search
CPC .......... H04N 21/26258; H04N 21/2541; G06F 9/381; G06F 17/30053
USPC ............ 709/231, 203; 707/695; 725/32, 136
See application file for complete search history.

(56) References Cited

U.S. PATENT DOCUMENTS

| | | | | |
|---|---|---|---|---|
| 7,634,625 B2* | 12/2009 | Otani et al. | | 711/161 |
| 8,099,473 B2* | 1/2012 | Biderman | | H04N 7/17318 380/212 |
| 8,335,775 B1* | 12/2012 | Sedlar | | G06F 17/30233 707/639 |
| 2003/0007780 A1* | 1/2003 | Senoh | | G11B 27/005 386/351 |
| 2007/0118873 A1* | 5/2007 | Houh et al. | | 725/136 |
| 2010/0235528 A1* | 9/2010 | Bocharov et al. | | 709/231 |
| 2011/0239078 A1* | 9/2011 | Luby et al. | | 714/752 |
| 2011/0246623 A1* | 10/2011 | Pantos | | H04L 65/1083 709/219 |
| 2012/0124618 A1* | 5/2012 | Ruiz-Velasco et al. | | 725/32 |
| 2013/0212342 A1* | 8/2013 | McCullough | | G11B 20/10527 711/156 |
| 2013/0238740 A1* | 9/2013 | Vass | | G06F 17/30902 709/213 |

OTHER PUBLICATIONS

Jonas John, RED (Remove Empty Directories), System cleaning freeware [online], 2011 [retrieved on Aug. 26, 2013]. Retrieved from the Internet: <URL: www.snapfiles.com/get/red.html>.*
Audials, dated Nov. 3, 2010. Retrieved from the Internet: <URL: http://audials.com/help/ed/audials/9/con_player.html>.*

(Continued)

*Primary Examiner* — Jeffrey Nickerson
*Assistant Examiner* — Ishrat Rashid

(57) ABSTRACT

A device may receive an update playlist file that lists segments of a content stream in an order that the segments are to be recombined by a client device; update a live playlist file based on the update playlist file; update a time playlist file by appending segment identifiers, which are included in the update playlist file and not included in the time playlist file, to the time playlist file; create a new playlist file that includes the segment identifiers and that does not include other segment identifiers; and send one of the live playlist file, time playlist file, or the new playlist file to a client device.

20 Claims, 11 Drawing Sheets

(56) References Cited

OTHER PUBLICATIONS

"Doug's Applescripts for iTunes", dated Jun. 1, 2010, Retrieved from the Internet: http://dougscripts.com/itunes/2010/06/new-delete-empty-playlists/.*
Jonas John, RED (Remove Empty Directories), System cleaning freeware [online], 2011 [retrieved on Aug. 26, 2013]. Retrieved from the Internet: www.snapfiles.com/get/red.html.*
Audials, dated Nov. 3, 2010. Retrieved from the Internet: http://audials.com/help/ed/audials/9/con~layer.html.*
"Doug's Applescripts for iTunes", dated Jun. 1, 2010, Retrieved from the Internet: http://dougscripts.com/itunes/2010/06/new-delete-empty-playlists/.*

* cited by examiner

402

| TIME | DIRECTORIES | | | | | |
|------|------|------|------|------|------|------|
| 09:00 | LIVE | 0900 | | | | |
| 90:01 | LIVE | 0900 | 0901 | | | |
| 09:02 | LIVE | 0900 | 0901 | 0902 | | |
| ... | | | | | | |
| 09:59 | LIVE | 0900 | 0901 | 0902 | ... | 0958 | 0959 |
| 10:00 | LIVE | 0901 | 0902 | 0903 | ... | 0959 | 1000 |
| 10:01 | LIVE | 0902 | 0903 | 0904 | ... | 1000 | 1001 |
| 10:02 | LIVE | 0903 | 0904 | 0905 | ... | 1001 | 1002 |
| 10:03 | LIVE | 0904 | 0905 | 0906 | ... | 1002 | 1003 |
| 10:04 | LIVE | 0905 | 0906 | 0907 | ... | 1003 | 1004 |
| 10:05 | LIVE | 0906 | 0907 | 0908 | ... | 1004 | 1005 |

604 → #EXTM3U
EXT-X-TARGETDURATION:60
EXT-X-MEDIA-SEQUENCE:100

EXTINF:60,
HTTPS://SHOW.COM/MOVIES/SEGMENT-100.TS

EXTM3U
EXT-X-TARGETDURATION:60
EXT-X-MEDIA-SEQUENCE:100

604 → #EXTINF:60,
HTTPS://SHOW.COM/MOVIES/SEGMENT-100.TS
606 → #EXTINF:60,
HTTPS://SHOW.COM/MOVIES/SEGMENT-101.TS

EXTM3U
EXT-X-TARGETDURATION:60
EXT-X-MEDIA-SEQUENCE:100

606 → #EXTINF:60,
HTTPS://SHOW.COM/MOVIES/SEGMENT-101.TS

| 0900 | 0901 | 0902 | ... | 1002 | 1003 | 1004 | 1005 |
|---|---|---|---|---|---|---|---|
| CREATE TIME 9:00 | CREATE TIME 9:01 | CREATE TIME 9:02 | ... | CREATE TIME 10:02 | CREATE TIME 10:03 | CREATE TIME 10:04 | CREATE TIME |
| DELETE TIME 10:00 | DELETE TIME 10:01 | DELETE TIME 10:02 | ... | DELETE TIME 11:00 | DELETE TIME 10:00 | DELETE TIME 11:00 | DELETE TIME 11:00 |

FIG. 9

LIVE STREAMING CIRCULAR BUFFER

BACKGROUND

Many of today's entertainment or communication-related electronic devices rely on receiving, transmitting, and/or using streaming digital data or content. For example, a set-top box may receive broadcast television programs and/or video-on-demand (VOD) that is streamed from a content provider. A personal computer may receive a stream of a video clip over the Internet. A soft phone may receive streaming audio data over a real-time transport protocol (RTP) link/channel that is established over an Internet Protocol (IP) network.

BRIEF DESCRIPTION OF THE DRAWINGS

FIG. 5 illustrates exemplary playlist directories in the HLS circular buffer of FIG. 4 at different times;

FIG. 6A illustrates an exemplary playlist file in a directory of FIG. 5;

FIGS. 6B and 6C illustrate the exemplary playlist files in the directories of FIG. 5;

FIG. 9 illustrates exemplary creation times and deletion times for different directories in the HLS circular buffer of FIG. 5.

DETAILED DESCRIPTION

The following detailed description refers to the accompanying drawings. The same reference numbers in different drawings may identify the same or similar elements. As used herein, the term "content" may refer to audio, video, and/or multimedia content (e.g., a movie, a three-dimensional (3D) movie, a show, a television program, a video stream, an audio stream, an Internet radio, broadcast of a live event (e.g., sporting event, concert, etc.), etc.). As used herein, the terms "directory" and "folder" may refer to a file that lists or contains other files. Each of the other files may be a directory.

As described herein, when a content processing system receives a content stream, the system may partition the stream into segments and generate a playlist. A playlist server may use the playlist to generate revised playlists in a hypertext transfer protocol (HTTP) live stream (HLS) circular buffer and publish the revised playlists. The HLS circular buffer allows a playlist server to provide a playlist file to client device for servicing "trick" modes, such as pause, rewind and fast forward, without modifying data formats within playlist files, creating metadata files, and/or making significant changes to the content processing system.

Figure 1:
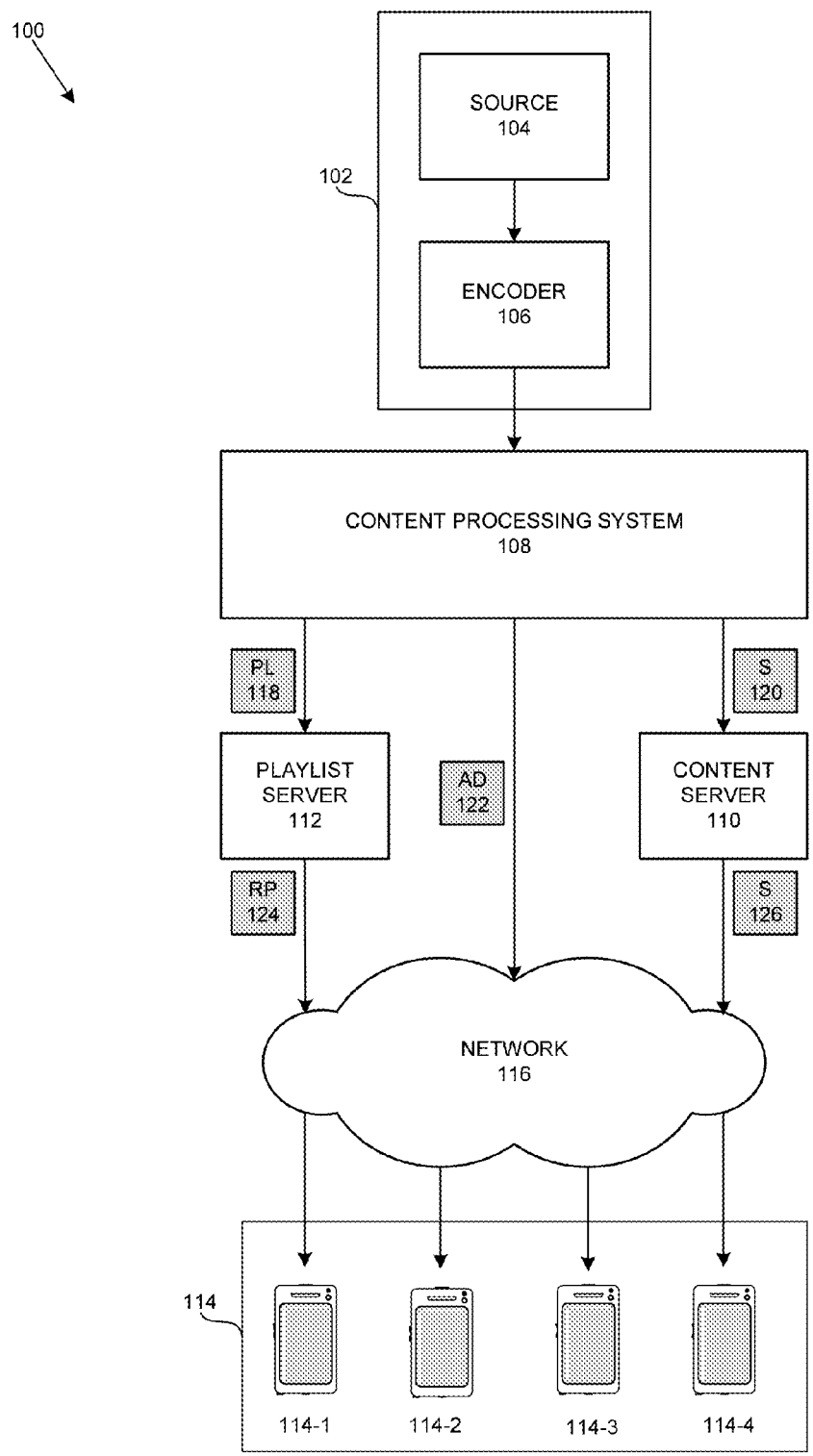
FIG. 1 illustrates an exemplary system for streaming content.

FIG. 1 illustrates an exemplary system 100 for streaming content. As shown, system 100 may include content source 102, which in turn includes a source 104 and encoder 106, a content processing system 108, a content server device 110, a playlist server device 112, client devices 114, and network 116.

Source 104 may include a live or prerecorded audio or video source. Encoder 106 may receive a signal from source 104 and encode the media. The encoding may include a format such as, for example, H.264, MPEG-4 Advanced Video coding (AVC), high efficiency advanced audio coding (HE-AAC), etc. Encoder 106 may send the encoded media in a transport stream (e.g., MPEG-2) to content processing system 108 for downstream processing.

Content processing system 108 may segment a content stream from content source 102 into segments (S) 120. In one implementation, content processing system 108 may produce files of an equal length/size (e.g., a file that corresponds to 1 minute of a media stream). In other implementations, content processing system 108 may split the stream into files of varying lengths. In some instances, file sizes may be capped at a threshold.

Content processing system 108 may also output an index file or a playlist (PL) 118 that lists storage locations (e.g., Universal Resource Locator (URL) or Universal Resource Identifier (URI), network addresses, etc.) of segments 120 in the order that segments 120 are to be reassembled or played at client devices 114. Examples of index/playlist files may include M3U8 files, M3U files, PLS files, Advanced Stream Redirector (ASX) files, etc.

Figure 2:
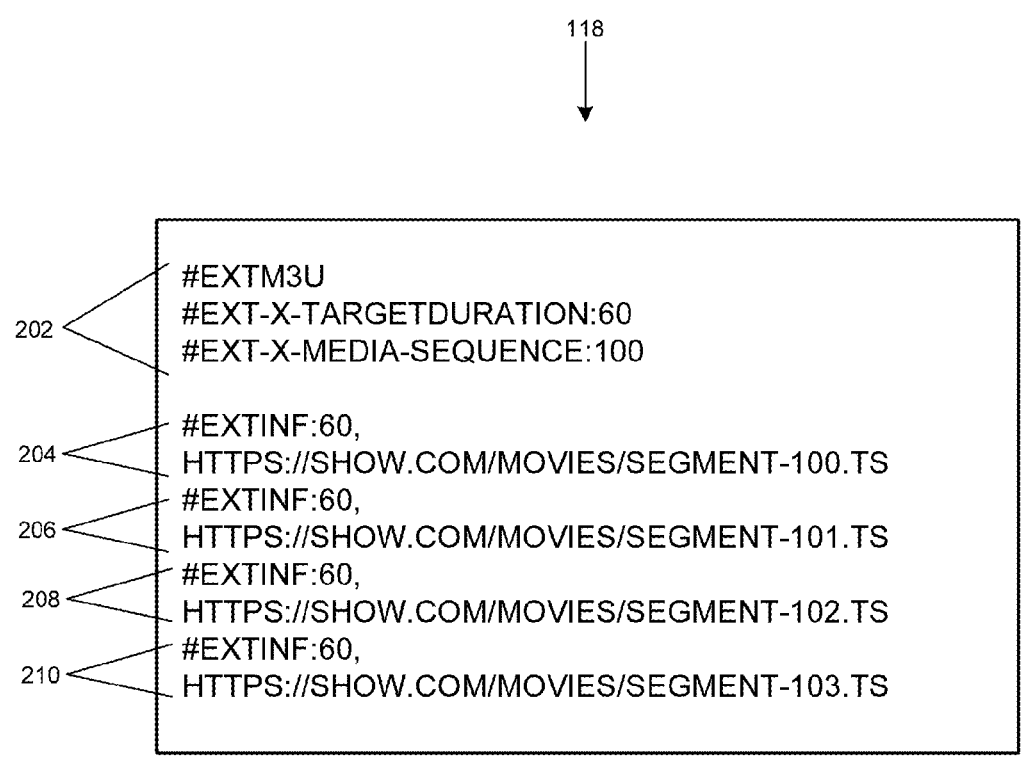
FIG. 2 illustrates an exemplary playlist file.

FIG. 2 shows an exemplary playlist 118. As shown, playlist 118 may include header 202 and segment identifiers 204 through 210. Playlist 118 is depicted for simplicity and does not include many components or identifiers that may be present in other playlist files (e.g., M3U8 files). Depending on the implementation, playlist 118 may include additional, fewer, different, or a different arrangement of components than those illustrated in FIG. 2.

As shown, header 202 includes a #EXTM3U statement, #EXT-X-TARGETDURATION statement, and #EXT-X-MEDIA-SEQUENCE statement. #EXTM3U indicates the type of playlist/index file (e.g., extension to M3U). #EXT-X-TARGETDURATION indicates the maximum duration of segments in playlist 118. In FIG. 2, the maximum duration is shown as 120 seconds.

EXT-X-MEDIA-SEQUENCE indicates a minimum sequence number of any file (i.e., segment) in playlist 118. For example, in FIG. 2, the minimum number is specified as 100. In segment identifiers 204-210, the actual the sequence numbers are 100, 101, 102, and 103 in strings HTTPS://SHOW.COM/MOVIES/SEGMENT-100.TS, HTTPS://SHOW.COM/MOVIES/SEGMENT-102.TS, and HTTPS://SHOW.COM/MOVIES/SEGMENT-103.TS.

Each of segment identifiers 204-210 includes a #EXTINF statement and a string (e.g., URL or URI). #EXTINF indicates the duration of the content segment. The string identifies a location of the segment. For example, segment identifier 204 indicates that the duration of the content segment is 60 seconds.

Returning to FIG. 1, as content processing system 108 receives a content stream from content source 102, content processing system 108 may continue to update playlist 118 by appending it with new segment identifiers. Content processing system 108 may send the updated playlist 118 to playlist server device 112. Given the content stream, content processing system 108 may send a stream of playlists 118 to playlist server device 112.

In some implementations, content processing system 108 may determine advertisement breakpoints in a content stream from content source 102. Furthermore, content processing system 108 may identify the locations of the detected breakpoints, within the content stream, and based on the identified locations of the breakpoints, generate a playlist 118 that includes identities (e.g., URL) of advertisements that are to be played by a client device 114, as well as identities of the content segments. Content processing system 108 may provide advertisements to a client device 114 over network 116 when the client device 114 requests the advertisements based on revised playlist (RP) 124 (to be described below).

In such implementations, to receive the content stream (e.g., via an HTTP live stream), client device 114 accesses or receives revised playlist 124. Consequently, client devices 114 may play content segments 126 and advertisements 122, in the sequence specified by revised playlist 124. To client devices 114, advertisements 122 and segments 126 may appear as if they are seamlessly spliced into a continuous stream.

Content server device 110 may receive segments 120 from content processing system 108 and provide segments (S) 126 to client devices 114. In some implementations or configurations, as content server device 110 receives segments, content server device 110 may remove a number of older segments that were received earlier. In these implementations, content server device 110 may retain segments that were received in a time window and serve such segments to client devices 114. Furthermore, content processing system 108 and/or playlist server 112 may produce playlists 118/124 whose segment identifiers are within the same time window.

Playlist server device 112 may receive playlists 118 from content processing system 108, create revised playlists 124 in a HLS circular buffer, and provide revised playlists 124 to client devices 114 over network 116. In addition, playlist server device 112 may allow a client device 114 to request trick modes, such as rewind, fast forward, pause, etc. For a live content stream, playlist server device 112 may continue to update the revised playlists 124 based on playlist 118 from content processing system 108, until a content stream terminates.

Client devices 114 may include devices 114-1 through 114-4 (individually client device 114). Each client device 114 may include a handset, cellular phone, smart phone, personal computer, laptop computer, tablet computer, set-top box, gaming console, personal digital assistant (PDA), and/or another type of communication and/or computational device that is capable of playing multimedia content. Client device 114 may download or receive a sequence of revised playlists 124, and based on revised playlists 124, may obtain content segments 126 and advertisements 122 from content server device 110 and content processing system 108, respectively. In FIG. 1, although client devices 114 are shown as including only devices 114-1 through 114-4, in an actual implementation, client devices 114 may include many more devices (e.g., 1,000, 10,000, 100,000, etc.). In addition, each of client devices 114 may receive the same or different revised playlists 124 than those received by other client devices 114.

Network 116 may include one or more wired and/or wireless networks that are capable of exchanging information, such as voice, video, documents, multimedia, text, etc., and capable of delivering content from one network element to another network element. For example, network 116 may include one or more public switched telephone networks (PSTNs) or another type of switched network. Network 116 may also include a number of transmission towers for receiving wireless signals and forwarding the signals toward the intended destination. Network 116 may further include one or more packet switched networks, such as an Internet protocol (IP) based network, a local area network (LAN), a wide area network (WAN), a personal area network (PAN), an intranet, the Internet, or another type of network that is capable of exchanging information.

Depending on the implementation, system 100 may include additional, fewer, or different components than those illustrated in FIG. 1. For example, in one implementation, system 100 may include additional content sources 102, content processing system 108, client devices 114, etc. Furthermore, although not illustrated in FIG. 1, in an actual implementation, system 100 may include different network components, such as switches, bridges, routers, gateways, firewalls, different types of client/server devices, etc.

In addition, depending on the implementation, one or more of the component shown in FIG. 1 may be implemented as software, hardware, and/or a combination of hardware and software. For example, in one implementation, encoder 106 may be implemented via off-the-shelf hardware devices. In another example, content processing system 108, content server device 110, and playlist server device 112 may be implemented as components of one or more application servers. In yet another example, components 108-112 may be implemented as scripts and/or programs in combination with web servers.

Figure 3:
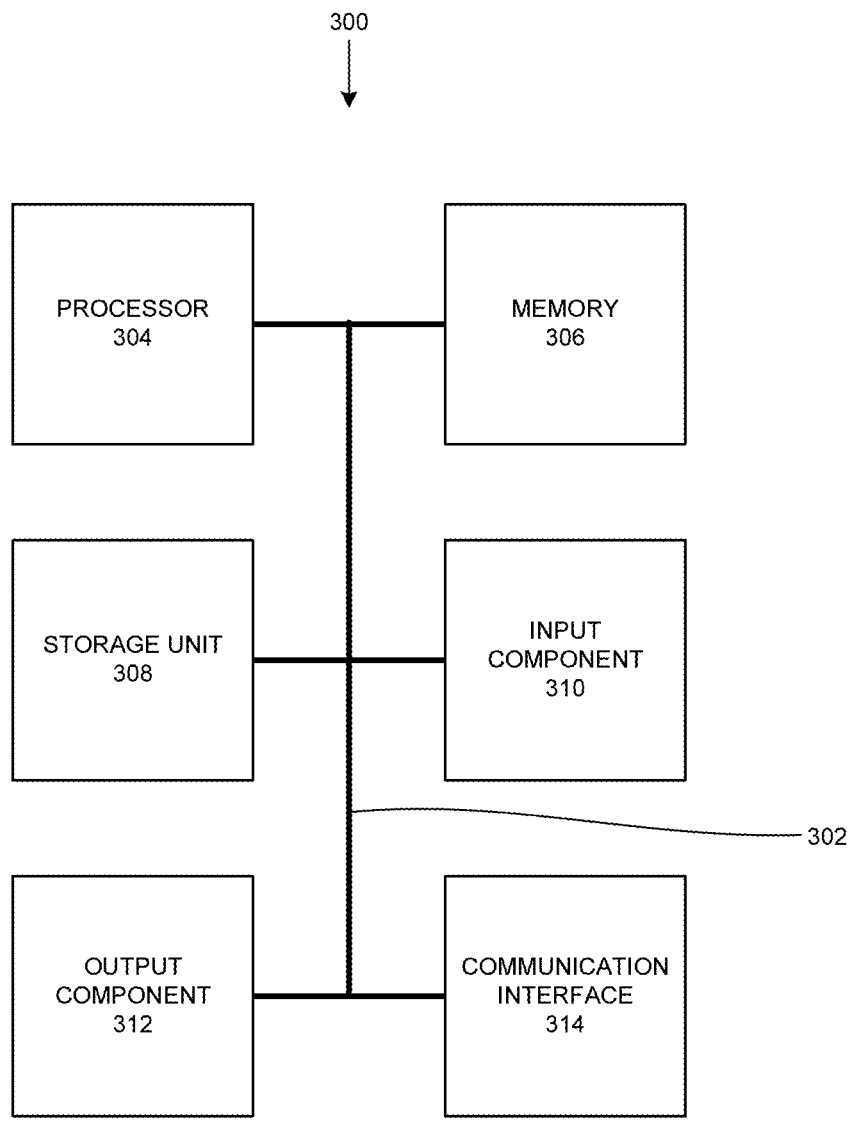
FIG. 3 is a block diagram of one or more devices on which the system of FIG. 1 may be implemented.

FIG. 3 is a block diagram of an exemplary network device 300. Network device 300 may correspond to one or more of devices on which components in FIG. 1 may be implemented. Referring to FIG. 3, network device 300 may include bus 302, processor 304, memory 306, storage unit 308, input component 310, output component 312, and communication interface 314. Bus 302 may include a path that permits communication among the elements of network device 300.

Processor 304 may include a processor, a microprocessor, an Application Specific Integrated Circuit (ASIC), a Field Programmable Gate Array (FPGA), and/or other processing logic (e.g., embedded devices) capable of controlling network device 300. Memory 306 may include static memory, such as read only memory (ROM), and/or dynamic memory, such as random access memory (RAM), or onboard cache, for storing data and machine-readable instructions (e.g., programs, scripts, etc.). Storage unit 308 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "storage device," and/or "storage unit" may be used interchangeably. For example, a "computer-readable storage device" may refer to both a memory and/or storage device.

Input component 310 may permit a user to input information to network device 300. Input component 310 may include, for example, a keyboard, a keypad, a mouse, a pen, a microphone, a touch screen, voice recognition and/or biometric mechanisms, etc. Output component 312 may include a mechanism that outputs information to the user. Output component 312 may include, for example, a display, a printer, a speaker, etc. In some implementations, because network device 300 may operate as a server device, network device 300 may include a minimal number of input components 310 and output components 312 (e.g., a keyboard and/or a console), to minimize cost and to increase robustness.

Communication interface 314 may include a transceiver (e.g., a transmitter or receiver) for network device 300 to communicate with other devices and/or systems. For example, via communication interface 314, network device 300 may communicate over a network, such as the Internet, an intranet, a terrestrial wireless network (e.g., a WLAN, WiFi, WiMax, etc.), a satellite-based network, optical network, etc. Communication interface 314 may also include a modem, an Ethernet interface to a LAN, and/or another interface.

Figure 4:
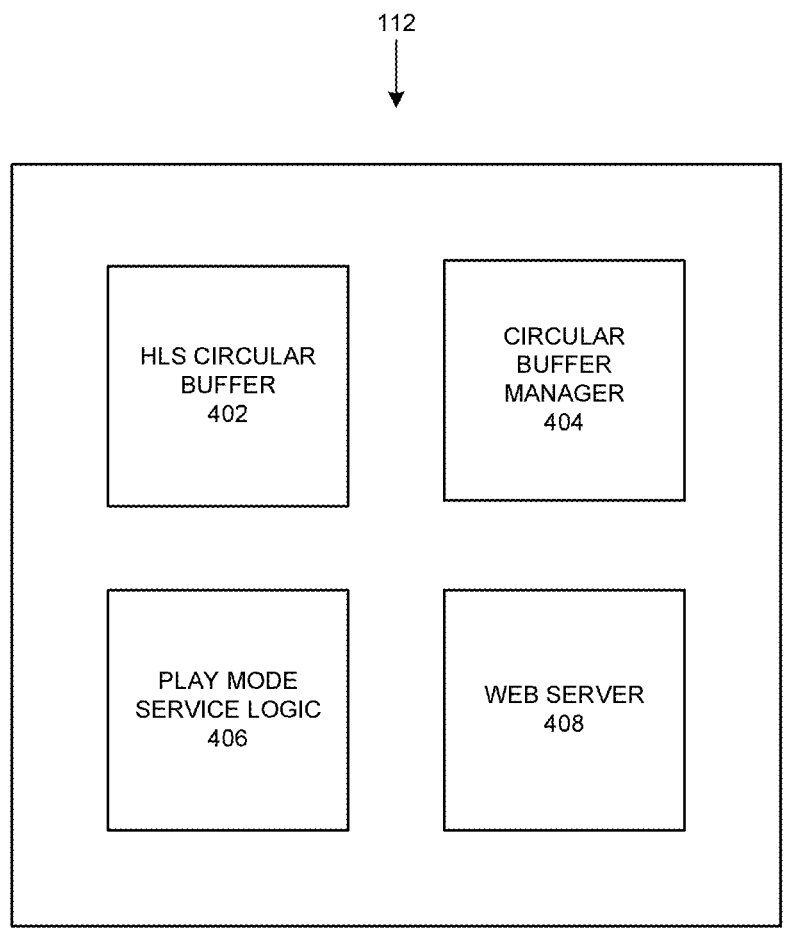
FIG. 4 is a functional block diagram of the playlist server device of FIG. 1.

FIG. 4 is a functional block diagram of playlist server device 112. As shown, playlist server device 112 may include a HLS circular buffer 402, a circular buffer manager 404, play mode service logic 406, and a web server 408. Depending on the implementation, playlist server device 112 may include additional, fewer, different, or a different arrangement of components than those illustrated in FIG. 4. For example, in one implementation, playlist server device 112 may include additional applications (e.g., application server, email server, etc.). In addition, although not illustrated in FIG. 4, playlist server device 112 may include other components, such as an operating system, device drivers, etc.

HLS circular buffer 402 may include one or more playlist folders/directories, each of whose name bears a timestamp. Each of the playlist folders/directories includes a playlist file, such as revised playlist 124. Circular buffer manager 404 may create and/or delete folders and files in HLS circular buffer 402 based on playlist files 118 that playlist server device 112 receives from content processing system 108. Both HLS circular buffer 402 and circular buffer manager 404 are described below in greater detail with reference to FIG. 5.

FIG. 5 illustrates exemplary playlist directories in HLS circular buffer 402 at different times. Assume that playlist server device 112 has begun to receive playlist files for only one media stream from content processing system 108 at 9:00 a.m. As shown in FIG. 5, at 9:00 a.m., HLS circular buffer 402 includes two directories, whose names are "LIVE" and "0900," respectively. At the start of the media stream at 9:00 a.m., circular buffer manager 404 creates these directories (if they do not already exist). In addition, circular buffer manager 404 stores copies of playlist file 118 received from content processing system 108 in LIVE directory and 0900 directory. FIG. 6A shows an exemplary playlist file 602 in the LIVE directory and 0900 directory of FIG. 5 at 9:00 a.m. As shown in FIG. 6A, playlist file 602 includes segment identifier 604. Segment identifier 604 identifies the network location at which the first segment of the media stream is stored.

Assume that at 9:01 a.m., playlist server device 112 receives an updated playlist file 118 from content processing system 108. Upon receipt of the file, circular buffer manager 404 updates playlist files 602 in LIVE directory and 0900 directory with the new playlist file. FIG. 6B shows playlist files 602 in LIVE directory and 0900 directory after the update. As shown in FIG. 6B, playlist file 602 includes segment identifier 604 and a new segment identifier 606.

At 9:01 a.m., in addition to updating playlist files 602 in LIVE and 0900 directories, circular buffer manager 404 also creates a new directory 0901 and a new playlist file therein. FIG. 6C shows the new playlist file 608 in directory 0901. As shown, playlist file 608 includes segment identifier 606, which is the segment identifier that was used to update playlist file 602 at 9:01 a.m. Put differently, 0901 directory contains a playlist file whose segment identifier 606 identifies the new media segment.

Figure 7A:
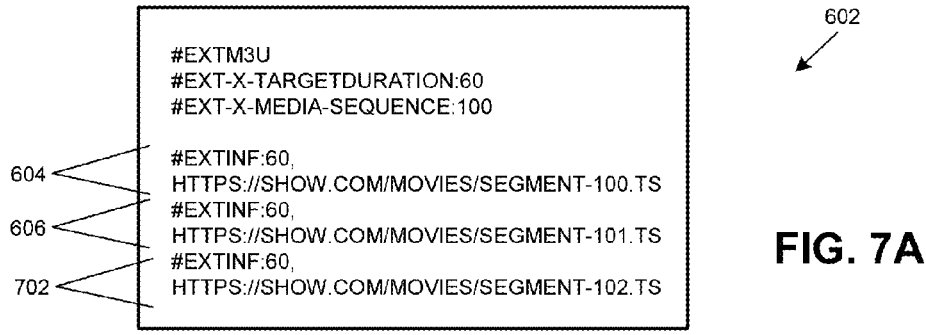
FIGS. 7A-7C illustrate the exemplary playlist files in the directories of FIG. 5.

Assume that at 9:02 a.m., playlist server device 112 receives another updated playlist file 118 from content processing system 108. Upon receipt of the file, circular buffer manager 404 updates playlist file 602 in the LIVE directory and 0900 directory. FIG. 7A shows playlist file 602 in the LIVE and 0900 directories after the update. As shown, playlist file 602 includes media segment identifiers 604, segment identifier 606, and segment identifier 702. Segment identifier 702 is the newly appended portion to the prior version of playlist file 602.

Figure 7B:
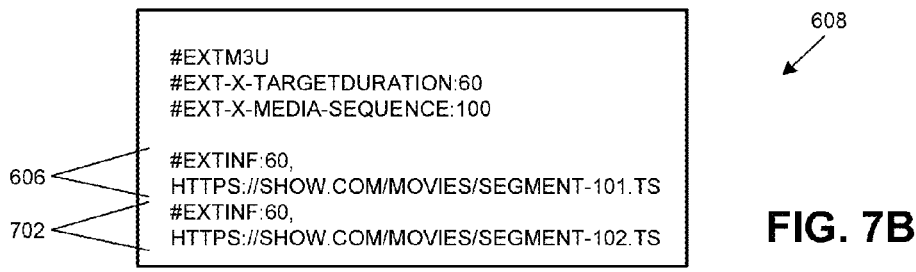

In addition to updating playlist file 602, circular buffer manager 404 also updates playlist file 608 in 0901 directory. FIG. 7B shows playlist file 608 in 0901 directory after the update. As shown, playlist file 608 includes segment identifier 606 and segment identifier 702.

Figure 7C:
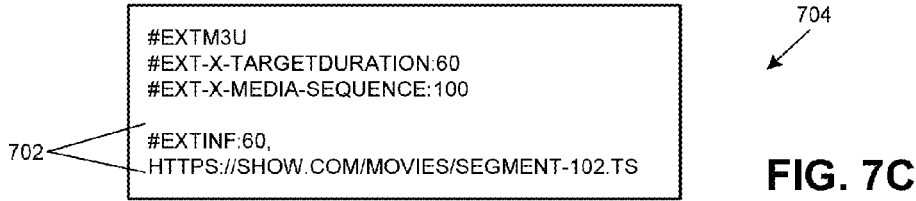

Furthermore, at 9:02 a.m., circular buffer manager 404 creates a new directory 0902 and a new playlist file. Circular buffer manager 404 stores the new playlist file in directory 0901. FIG. 7C shows the new playlist file 704. As shown, the new playlist file 704 includes segment identifier 702, which is the segment identifier that was used to update playlist file 602 at 9:02 a.m.

Returning to FIG. 5, as time passes, circular buffer manager 404 continues to update playlist files in the existing directories and create new playlist files/directories at regular time intervals upon receipt of playlist files 118 from content processing system 108, in a manner similar to those described above for directories 0900, 0901, and 0902.

Once the elapsed time (since the start of the media stream) passes a particular threshold, circular buffer manager 404 no longer updates files whose age is longer than the threshold (herein also referred to as "buffer threshold"), and removes such files from HLS circular buffer 402. If the directory that contains one of the removed files is empty, the directory may also be removed. Circular buffer manager 404 continues to update other playlist files whose age is shorter than the buffer threshold. Circular buffer manager 404 also continues to create new files and/or directories that correspond to updated playlist files received from content processing system 108.

For example, with reference to FIG. 5, assume that the buffer threshold is one hour, and that content processing system 108 sends updated playlist file every minute. As shown in FIG. 5, by 9:59 a.m., HLS circular buffer 402 includes directories LIVE, 0900, 0901, . . . 0959. When an hour elapses, and content processing system 108 sends the latest updated playlist file 118 at 10:00 a.m., circular buffer manager 404 deletes the playlist file in directory 0900, because the age of the file is one hour. Assuming that the directory 0900 has become empty (e.g., 0900 contained only one file that was deleted), circular buffer manager 404 removes directory 0900 and updates files in directories 0901-0959. In addition, circular buffer manager 404 creates a new file reflecting the update, and places the file in a new directory 1000. FIG. 5 shows the result of this process.

Circular buffer manager 404 may not handle or manage files in LIVE directory (e.g., a directory that contains files from content processing system 108) in the same manner that circular buffer manager 404 manages files in other directories, such as 0900, 0901, etc. (herein referred to as "time directories"). When circular buffer manager 404 begins to receive playlist files 118 from content processing system 108 for a particular media stream, circular buffer manager 404 creates the first playlist file for the media stream in the LIVE directory and the directory that corresponds to the start time of the transmission of playlist files from content processing system 108 ("start time directory") (e.g., 0900 directory in FIG. 5). Playlist files in both the LIVE directory and the time directory are identically updated, until the buffer threshold elapses. Circular buffer manager 404 then removes the playlist file in the start time directory (and the start time directory itself, if it is empty). Circular buffer manager 404, however, does not remove the playlist file in LIVE directory, and continue to update its playlist file in accordance with the playlist files 118 received from content processing system 108.

In one implementation, the playlist file in the LIVE directory, for a media stream, may include a sequence of segment identifiers for segments whose aggregate play time spans the buffer threshold). In a different implementation, the playlist file in LIVE director, for a media stream, may include a sequence of segment identifiers for segments whose aggregate playtime spans the entire duration of the media stream.

Returning to FIG. 4, depending on the implementation, playlist server device 112 may include multiple circular buffers 404 for multiple media streams. In one implementation, a single HLS circular buffer 404 may correspond to a single media stream. In a different implementation, a single HLS circular buffer 404 may correspond to multiple media streams. In such an implementation, each directory may contain multiple playlist files, wherein each of the playlist files corresponds to a different media stream. When a buffer threshold elapses and a particular playlist file (whose age is greater than the buffer threshold) is deleted, the directory may not be deleted, if the directory includes playlist files corresponding to other media streams being received by content processing system 108.

Play mode service logic 406 may services requests from client devices 114. The request may be the result of an application (e.g., a browser, a browser plug-in, stand-alone client application, etc.) in client device 114 performing particular process/set of steps in response to user input. For example, assume that a user at client device 114-1 inputs a request for to play a live streaming media at 9:02 a.m. In such an instance, the application may send a request to play mode service logic 406 for the application to view the stream, starting at 9:02 a.m.

When play mode service logic 406 receives a request for a media stream from client device 114, play mode service logic 406 may provide client device 114 with a playlist file whose time directory corresponds to the time of (or associated with) the request. For example, if play mode service logic 406 receives a request for a playlist files 124 at 9:05:26 a.m., play mode service logic 406 may provide client device 114 with the revised playlist file 124 from either 0905 directory or 0906 directory, depending on whether the time 9:05:26 a.m. is rounded up/down to the nearest minute. When the playlist file 124 is updated, the update is sent to client device 114.

When the duration for which client device 114 has been accessing a playlist file from a particular time directory becomes greater than the buffer threshold, play mode service logic 406 redirects client device 114 to the playlist file (for the media stream) in the LIVE directory. The playlist file in the time directory would no longer be available, since the playlist file is deleted after a period corresponding to the buffer threshold elapses.

Because each playlist file in time directories has a first segment identifier that does not change with time, when client device 114 receives the playlist file, client device 114 can traverse the list of segment identifiers in the playlist file and select an appropriate segment to provide for a particular trick mode. For example, assume that a user begins to receive a media stream at 9:30 a.m., and the user requests client device 114 to rewind to 9:15 a.m. Client device 114 can use the playlist obtained from playlist server device 112 to select a segment file to rewind to 9:15 a.m. That is, client device 114 may rewind a media stream up to the time when client device 114 "joined" or began to receive the stream/playlist files.

In some implementations, play mode service logic 406 may allow client device 114 to perform a trick play/mode that requires a segment file which is not identified in the playlist file. In such an instance, client device 114 may request a different playlist file from playlist server device 112. For example, assume that client device 114 obtains a playlist file from 0915 directory, at 9:15 a.m. At 9:30 a.m., client device 114 requests a rewind to 9:10 a.m. In such an instance, the playlist file for 9:15 a.m. does not identify the segment file for 9:10 a.m., and client device 114 may request a playlist file that identifies a segment file corresponding to 9:10 a.m. Depending on the implementation, play mode service logic 406 may not allow client device 114 to obtain/switch to a playlist file different from the one initially obtained by client device 114 (other than the playlist file in the LIVE directory).

Web server 408 may operate in conjunction with play mode service logic 406 to provide playlist files to client devices 114.

Figure 8:
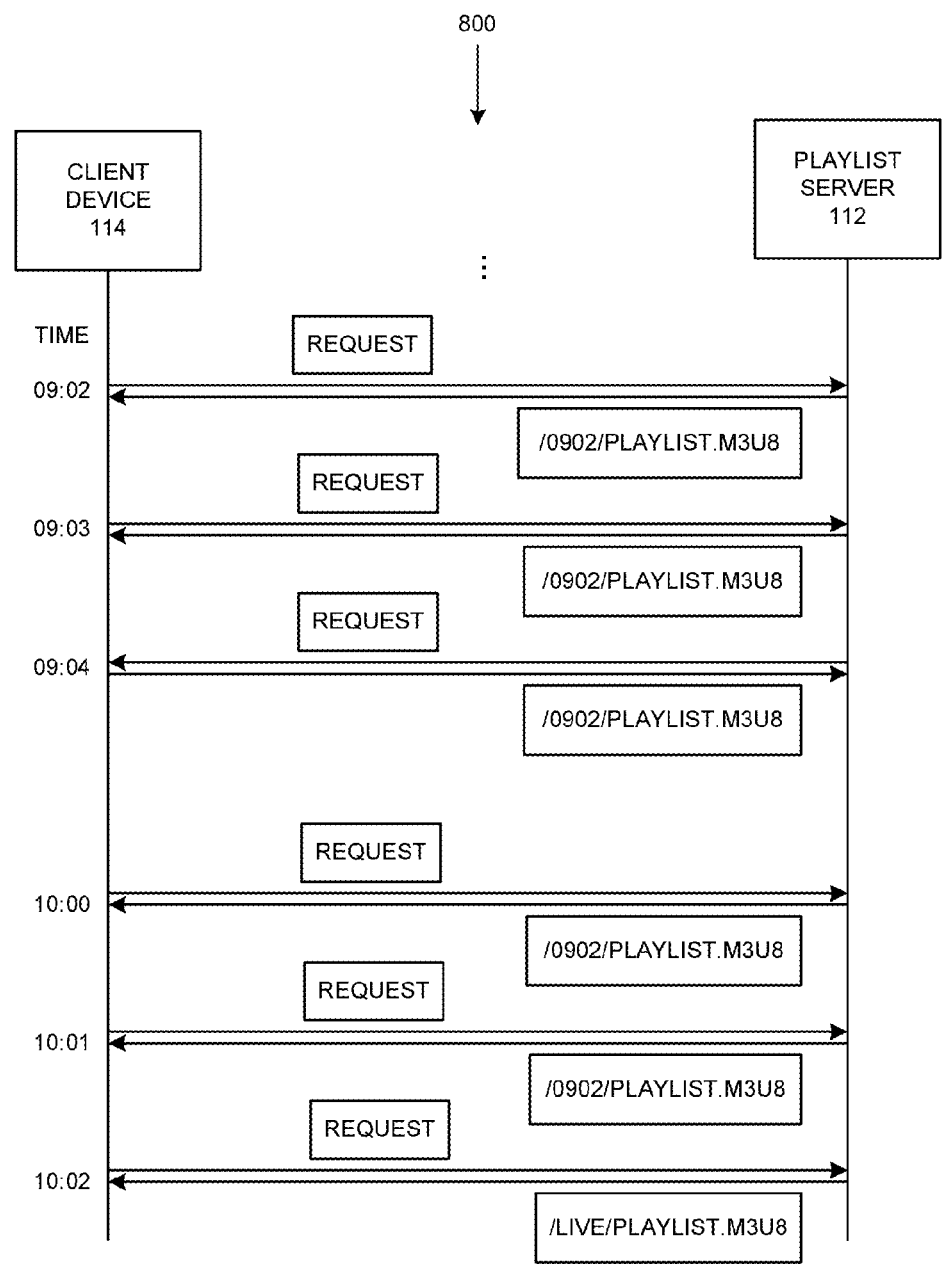
FIG. 8 illustrates exemplary messages that are transmitted between a client device of FIG. 1 and the playlist server device of FIG. 1.

FIG. 8 is a diagram 800 illustrating exemplary messages that are transmitted between client device 114 and playlist server device 112. As shown, client device 114 sends a request for a playlist file to playlist server device 112 at 9:02 a.m. In response, playlist server device 112 sends back the playlist file playlist.m3u8 in the 0902 directory. Until 10:02 a.m., each time client device 114 requests a playlist file, playlist server device 112 sends updated playlist file playlist.m3u8 from the 0902 directory. From 10:02 a.m. and thereafter, playlist server device 112 responds to requests from client device 114 by providing the playlist file playlist.m3u8 from the LIVE directory. In this illustration, after 10:02 a.m., circular buffer manager 404 deletes both playlist.m3u8 in directory 0902 and the directory 0902 itself.

FIG. 9 shows exemplary creation times and deletion times for different directories, in HLS circular buffer 402 of FIG. 5. As indicated above, in some implementations, each of the directories in FIG. 5 may contain only one playlist file. Assume that the buffer threshold is one hour and that the media stream corresponding to the directories begins and ends streaming at 9:00 a.m. and 11:00 a.m., respectively. As shown in FIG. 9, the directories 0900, 0901, 0902, . . . 1002, 1003, 1004, and 1005 are created at 9:01, 9:02, . . . 10:02, 10:03, 10:04, and 10:05 a.m., respectively. In addition, the directories 0900, 0901, and 0902 are deleted at 10:00, 10:01, and 10:02 a.m., respectively. Directories 1002, 1003, 1004, and 1005 are deleted at 11:00 a.m. The deletion times for these directories (and files within the directories) occur around the time that the media stream ends, and therefore, the lifespan for each of the files does not span the buffer threshold.

In a different implementation, each playlist file in the time directories in HLS circular buffer 402 is not removed after a period equivalent to the buffer threshold. In these implementations, because no playlist file/directory is deleted after the media stream ends, the LIVE directory is not needed, and thus not implemented. In this case, client device 114 that has been accessing a playlist in a particular directory will continue to access the same playlist file in the directory after the buffer threshold time elapses. Thereafter, assuming that the segments of the media stream are retained at content server 110, the playlist files may be used to provide for a video-on-demand service.

Figure 10:
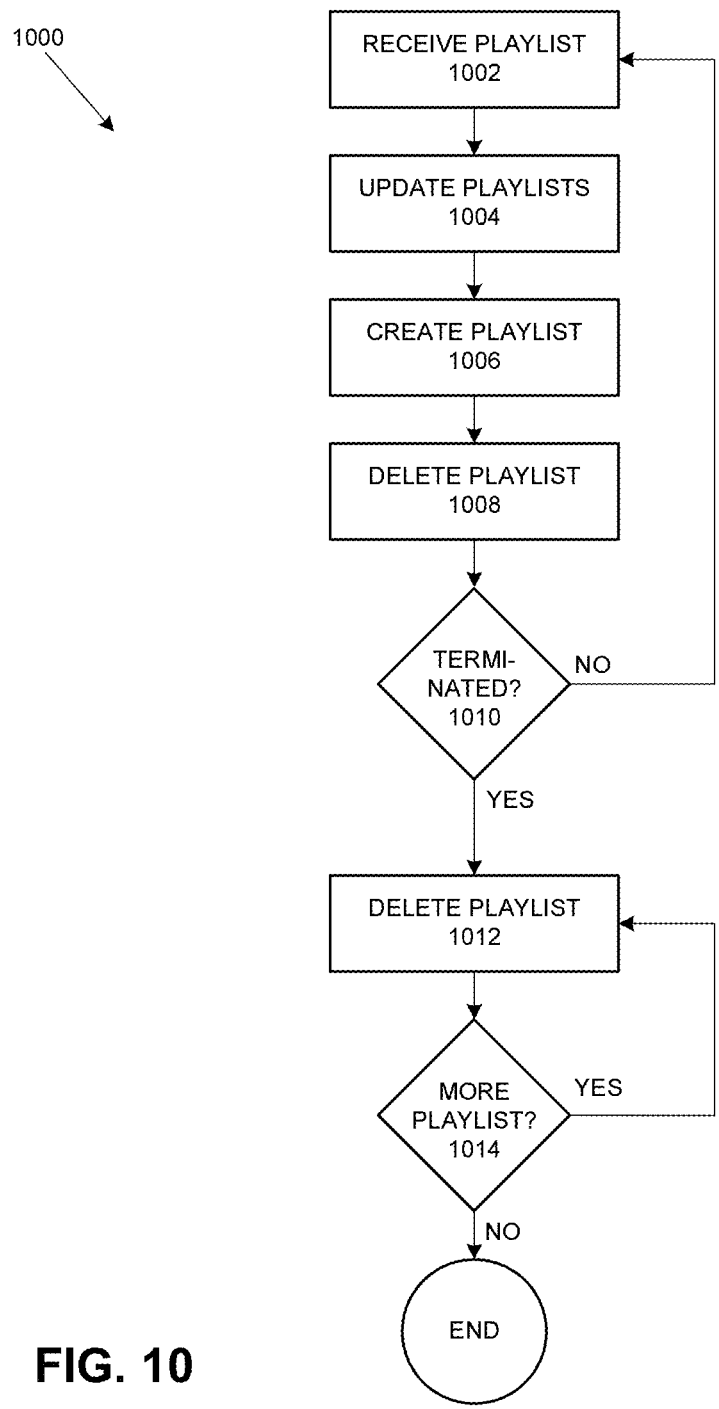
FIGS. 10 and 11 are flow diagrams of exemplary processes that are associated with the playlist server device of FIG. 1.

FIG. 10 is a flow diagram of an exemplary process 1000 that is associated with playlist server device 112. More specifically, process 1000 is associated with playlist server device 112 updating playlist files in HLS circular buffer 402 based on a playlist file 118 received from content processing system 108. As shown, process 1000 may include playlist server device 112 receiving a playlist file 118 from content processing system 108 (block 1002).

When playlist server device 112 receives a playlist file 118, playlist server device 112 may update playlists files whose time directories bear earlier timestamps (block 1004). For example, if a playlist file for a media stream is received at 9:10 a.m., playlist server device 112 may update playlist files in directories whose time stamps are between the time of the start of the media stream and the current time (e.g., 9:01, 9:02, 9:03, 9:04, . . . 9:09 a.m., assuming that the media stream began at 9:00 a.m. and the current time is 9:10 a.m.). In addition, playlist server device 112 may update the playlist for the media stream in the LIVE directory (or an equivalent. directory). In one implementation, updating the LIVE directory may consist of simply copying the received playlist 118 over the playlist in LIVE directory.

In addition to updating playlist files, playlist server device 112 may create a new playlist file that corresponds to the time of receipt of the playlist file 118 (block 1006). For example, if playlist server device 112 receives a playlist file 118 at 9:30 a.m., playlist server device 112 may create a playlist file corresponding to the time and a directory whose name corresponds to the time, such as "0930." Playlist server device 112 may place the playlist file in the directory 0930.

If the received playlist file is the first playlist file for a media stream, playlist server device 112 may place the file inside the LIVE directory. If the LIVE directory for the stream does not yet exist, playlist server device 112 may first create the LIVE directory.

In addition to updating/creating playlist files, playlist server device 112 may also scan its existing playlist files and delete playlist files whose age is greater than a buffer threshold (block 1008). If the directory containing a playlist file is empty, playlist server device 112 may also delete the directory.

Playlist server device 112 may determine whether the media stream has terminated (block 1010). There are several ways of determining whether the media stream has terminated. One way is to detect that content processing system 108 is no longer sending updated playlist files to playlist server device 112. Alternatively, content processing system 108 may signal that it has sent the last playlist file for the media stream.

If the media stream has not terminated (block 1010: no), playlist server device 112 may return to block 1002. If the media stream has terminated (block 1010: yes), playlist server device 112 may delete a playlist file (block 1012), depending on the duration of time for which playlist server device 112 is to retain the playlist files. In the case where the duration of storage is zero, playlist server device 112 may delete a playlist file and/or its directory.

Playlist server device 112 may determine whether there are any more playlist files to delete (block 1014). If there are more playlist files to delete (block 1014: yes), playlist server device 112 may return to block 1012. Otherwise (block 1014: no), playlist server device 112 may terminate process 1000.

Figure 11:
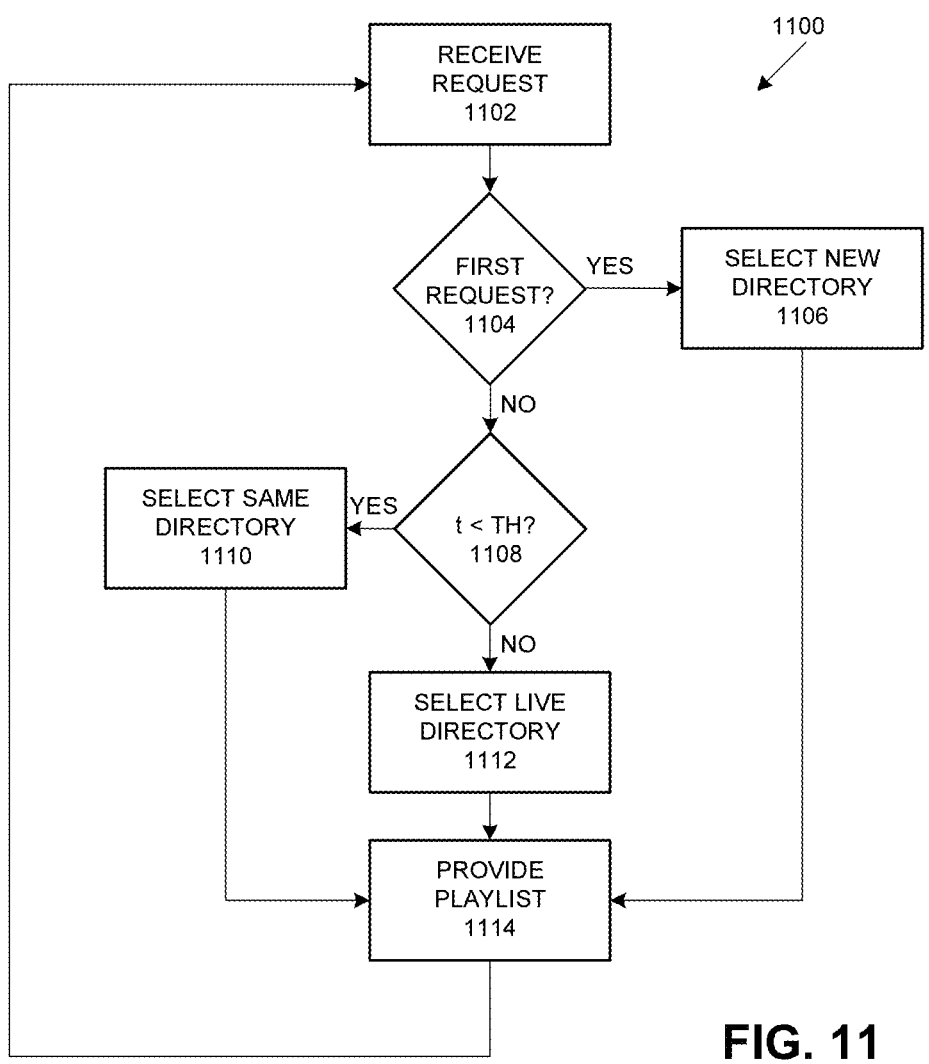

FIG. 11 is a flow diagram of another exemplary process 1100 that is associated with playlist server device 112. More specifically, process 1100 is associated with playlist server device 112 providing client device 114 with playlist files. As shown in FIG. 11, process 1100 may include playlist server device 112 receiving a request for a playlist file from client device 114 (block 1102).

Playlist server device 112 may determine whether the request from client device 114 is a first request in a session for receiving the media stream (block 1104). If the request is the first request, for the session (block 1104: yes), playlist server device 112 may select a directory whose time stamp (e.g., the name of the directory) reflects the time of the request (block 1106). If the request is not the first request of the session (block 1104: no), playlist server device 112 may determine whether a time "t" that elapsed since the first request is less than the buffer threshold (block 1108).

If the time t is less than the buffer threshold (block 1108: yes)), playlist server device 112 may select the same directory from which playlist server device 112 obtained the prior playlist provided to client device 114 (block 1110). Otherwise (block 1108: no), playlist server device 112 may select the LIVE directory (or a directory with a different name, but that includes playlist files from content processing system 108) (block 1112). After the time directory is selected at one of blocks 1106, 1110, or 1112, playlist server device 112 may provide the playlist file from the selected directory (block 1114). Processing may then return to block 1102.

As described above, when content processing system 108 receives a content stream, content processing system 108 may partition the stream into segments and generate a playlist. Playlist server device 112 may use the playlist to generate revised playlists in HLS circular buffer 402 and publish the revised playlists. HLS circular buffer 402 allows playlist server device 112 to provide playlists for client device for servicing trick plays/modes, such as rewind, pause, and fast forward, without modifying data formats within the playlist files, creating metadata files, and/or significant changes to live content processing system 108.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

In addition, while series of blocks have been described with regard to an exemplary processes illustrated in FIGS. 10 and 11, the order of the blocks may be modified in other implementations. In addition, non-dependent blocks may represent acts that can be performed in parallel to other blocks.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, act, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A system comprising:
   a circular buffer comprising a memory configured to store a plurality of directories, wherein each directory, of the plurality of directories, bears a timestamp and stores a playlist file, and wherein the plurality of directories includes a live directory that stores a live playlist file that includes segment identifiers of segments that span an entire duration of a content stream; and
   a playlist server device comprising one or more processors, the one or more processors configured to:
   receive an update playlist file that lists segment identifiers of segments of the content stream in an order that the segments are to be recombined by a client device, wherein the update playlist file includes segment identifiers of segments previously listed in the live playlist file and a segment identifier of a new segment that was not listed in the live playlist file;
   determine whether an elapsed time since a start of the content stream has passed a threshold amount of time;
   update, when the elapsed time has not passed the threshold amount of time, the live playlist file based on the update playlist file, wherein, when updating the live playlist file, the playlist server device is configured to copy the received update playlist file over the live playlist file stored in the live directory;
   update, when the elapsed time has not passed the threshold amount of time, one or more time playlist files by appending the segment identifier of the new segment to the one or more time playlist files, wherein the one or more time playlist files include segment identifiers of segments that span a portion of the content stream, and wherein the one or more time playlist files are stored in directories with timestamps corresponding to times between a start time of the content stream and a time when the update playlist file was received;
   create a new playlist file that includes the segment identifier of the new segment, wherein the new playlist file identifies a newest segment of the content stream, wherein the new playlist file is created at a time when the update playlist file is received, and wherein the new playlist file is stored in a directory with a timestamp corresponding to the time when the update playlist file was received;
   receive a request, from the client device, for a playlist file;
   determine that whether the request is a first request of a session for the content stream;
   in response to determining that the request is the first request of the session for the content stream, select, as a selected directory, a directory, of the plurality of directories, with a timestamp that reflects identifies a time of the first request in response to determining that the request is the first request of the session for the content stream;
   provide the playlist file from the selected first directory;
   receive a subsequent request, from the client device, for a playlist file;
   determine that the subsequent request is not the first request of the session for the content stream;
   in response to determining that the subsequent request is not the first request of the session for the content stream, determine that whether an amount of time since the first request is less greater than the threshold amount of time in response to determining that the request is not the first request of the session;
   in response to determining that the amount of time since the first request is less than the threshold amount of time, select, as the selected directory, the same first directory with the timestamp that reflects identifies the time of the first request in response to determining that the amount of time since the first request is less than the threshold;
   provide the playlist file from the selected same directory;
   receive another subsequent request, from the client device, for a playlist file;
   determine that the another subsequent request is not the first request of the session for the content stream;
   in response to determining that the another subsequent request is not the first request of the session for the content stream, determine that the amount of time since the first request is greater than the threshold amount of time;
   in response to determining that the amount of time since the first request is greater than the threshold amount of time, select, as the selected directory, the live directory in response to determining that the amount of time since the first request is not less than the threshold; and
   send, to the client device, a provide the playlist file from the selected live directory.

2. The system of claim 1, further comprising:
   a content processing system configured to:
   partition the content stream to generate the new segment;
   generate the update playlist file; and
   send the update playlist file to the playlist server device.

3. The system of claim 2, further comprising:
   a content source that provides the content stream to the content processing system.

4. The system of claim 1, wherein the update playlist file includes a M3U8file.

5. The system of claim 1, wherein the client device includes one of:
   a personal computer, a laptop computer, a netbook computer, a smart phone, a game console, or a tablet computer.

6. The system of claim 1, wherein the plurality of directories includes a first time directory that includes a time playlist file of the one or more time playlist files and a second time directory that includes the new playlist file,
   wherein the first time directory bears a timestamp of a time at which the time playlist file was created, and the second time directory bears a timestamp of a time at which the new playlist file was created.

7. The system of claim 1, wherein the one or more processors are further configured to:
   receive, from the client device, a request for a trick mode playlist file whose time directory bears a timestamp earlier than a timestamp of the first request; and
   send the trick mode playlist file to the client device.

8. The system of claim 1, wherein the one or more processors are further configured to:

identify a particular playlist file whose time directory is older than a particular threshold; and delete the particular playlist file.

9. The system of claim 8, wherein the one or more processors are further configured to:

delete a time directory that included the particular playlist file after deleting the particular playlist file in response to determining that the time directory is empty.

10. The system of claim 1, wherein the one or more processors are further configured to:

remove the one or more time playlist files and the new playlist file when the content stream terminates.

11. A method comprising: storing a plurality of directories, wherein each directory, of the plurality of directories, bears a timestamp and stores a playlist file, and wherein the plurality of directories includes a live directory that stores a live playlist file that includes segment identifiers of segments that span an entire duration of a content stream;

receiving an update playlist file that lists segment identifiers of segments of the content stream in an order that the segments are to be recombined by a client device, wherein the update playlist file includes segment identifiers of segments previously listed in the live playlist file and a segment identifier of a new segment, wherein the segment identifier of the new segment was not listed in the live playlist file;

determining whether an elapsed time since a start of the content stream has passed a threshold amount of time;

updating, when the elapsed time has not passed the threshold amount of time, the live playlist file based on the update playlist file by copying the received update playlist file over the live playlist file stored in the live directory;

updating, when the elapsed time has not passed the threshold amount of time, one or more time playlist files by appending the segment identifier of the new segment to the one or more time playlist files, wherein the one or more time playlist files include segment identifiers of segments that span a portion of the content stream, and wherein the one or more time playlist files are stored in directories with time stamps corresponding to times between a start of the content stream and a time when the update playlist file was received;

creating a new playlist file that includes the segment identifier of the new segment, wherein the new playlist file identifies a newest segment of the content stream, wherein the new playlist file is created at a time when the update playlist file is received, and wherein the new playlist file is stored in a directory with a timestamp corresponding to the time when the update playlist file was received;

receiving a request, from the client device, for a playlist file;

determining that whether the request is a first request of a session for the content stream;

in response to determining that the request is the first request of the session for the content stream, selecting, as a selected directory and in response to determining that the request is the first request of the session for the content stream, a directory, of the plurality of directories, with a timestamp that reflects identifies a time of the first request;

providing the playlist file from the selected directory;

receiving a subsequent request, from the client device, for a playlist file; determining that the subsequent request is not the first request of the session for the content stream;

in response to determining that the subsequent request is not the first request of the session for the content stream, determining, in response to determining that the request is not the first request of the session, whether that an amount of time since the first request is less greater than the threshold amount of time;

in response to determining that the amount of time since the first request is less than the threshold amount of time, selecting, as the selected directory and in response to determining that the amount of time since the first request is less than the threshold, the same directory with the timestamp that reflects identifies the time of the first request;

providing the playlist file from the selected same directory;

receiving another subsequent request, from the client device, for a playlist file; determining that the another subsequent request is not the first request of the session for the content stream;

in response to determining that the another subsequent request is not the first request of the session for the content stream, determining that the amount of time since the first request is greater than the threshold amount of time;

in response to determining that the amount of time since the first request is greater than the threshold amount of time, selecting, as the selected directory and in response to determining that the amount of time since the first request is not less than the threshold, the live directory; and sending, to the client device, providing the playlist file from the selected live directory.

12. The method of claim 11, wherein the plurality of directories includes a first time directory that includes a time playlist file of the one or more time playlist files and a second time directory that includes the new playlist file, and wherein the first time directory bears a timestamp of a time at which the time playlist file was created, and the second time directory bears a timestamp of a time at which the new playlist file was created.

13. The method of claim 11, further comprising:

receiving a request, from the client device, for a trick mode playlist file whose time directory bears a timestamp earlier than a timestamp of the first request; and sending the trick mode playlist file to the client device.

14. The method of claim 11, further comprising:

identifying a particular playlist file whose time directory is older than a particular threshold; and deleting the particular playlist file.

15. The method of claim 14, further comprising:

deleting a time directory that included the particular playlist file after deleting the particular playlist file.

16. A non-transitory computer-readable storage medium, comprising computer-executable instructions for causing one or more processors executing the computer-executable instructions to:

store a plurality of directories, wherein each directory, of the plurality of directories, bears a timestamp and stores a playlist, and wherein the plurality of directories includes a live directory that stores a live playlist that includes segment identifiers of segments that span an entire duration of a content stream;

receive an update playlist that lists segment identifiers of segments of the content stream in an order that the segments are to be recombined by a client device, wherein the update playlist includes segment identifiers of segments previously listed in the live playlist and a segment identifier of a new segment that was not listed in the live playlist; determine whether an elapsed time since a start of the content stream has passed a threshold amount of time;

update, when the elapsed time has not passed the threshold amount of time, the live playlist based on the update playlist by copying the received update playlist over the live playlist stored in the live directory;

update, when the elapsed time has not passed the threshold amount of time, a time playlist by appending the segment identifier of the new segment to the time playlist, wherein the time playlist includes segment identifiers of segments that span a portion of the content stream, and wherein the time playlist is stored in a directory with a timestamp corresponding to a time between a start time of the content stream and a time when the update playlist was received;

create a new playlist that includes the segment identifier of the new segment, wherein the new playlist identifies a newest segment of the content stream, wherein the new playlist is created at a time when the update playlist is received, and wherein the new playlist is stored in a directory with a timestamp corresponding to a time when the update playlist was received;

receive a request, from the client device, for a first playlist;

determine that the request is a first request of a session for the content stream;

in response to determining that the request is the first request of the session for the content stream, select a first directory with a timestamp that reflects identifies a time of the first request;

provide the first playlist from the selected first directory;

receive a subsequent request, from the client device, for a playlist file;

determine that the subsequent request is not the first request of the session for the content stream;

in response to determining that the subsequent request is not the first request of the session for the content stream, determine that an amount of time since the first request is less than the threshold amount of time;

in response to determining that the amount of time since the first request is less than the threshold amount of time, select the same first directory with the timestamp that reflects the time of the first request;

provide the playlist file from the selected same first directory;

receive another subsequent request, from the client device, for a playlist file;

determine that the another subsequent request is not the first request of the session for the content stream;

in response to determining that the another subsequent request is not the first request of the session for the content stream, determine that the amount of time since the first request is greater than the threshold amount of time;

in response to determining that the amount of time since the first request is greater than the threshold amount of time, select the live directory; and provide the playlist file from the selected live directory.

17. The computer-readable storage medium of claim 16, further comprising computer-executable instructions for causing one or more processors executing the computer-executable instructions to:
identify a particular playlist whose time directory is older than a particular threshold; and
delete the particular playlist.

18. The computer-readable storage medium of claim 17, further comprising computer-executable instructions for causing one or more processors executing the computer-executable instructions to:
delete a time directory that included the particular playlist after deleting the particular playlist.

19. The method of claim 11, further comprising:
removing the one or more time playlist files and the new playlist file when the content stream terminates.

20. A non-transitory computer-readable storage medium, comprising computer-executable instructions for causing one or more processors executing the computer-executable instructions to:
store a plurality of directories, wherein each directory, of the plurality of directories, bears a timestamp and stores a playlist, and wherein the plurality of directories includes a live directory that stores a live playlist that includes segment identifiers of segments that span an entire duration of a content stream;

receive an update playlist that lists segment identifiers of segments of the content stream in an order that the segments are to be recombined by a client device, wherein the update playlist includes segment identifiers of segments previously listed in the live playlist and a segment identifier of a new segment that was not listed in the live playlist;

determine whether an elapsed time since a start of the content stream has passed a threshold amount of time;

update, when the elapsed time has not passed the threshold amount of time, the live playlist based on the update playlist by copying the received update playlist over the live playlist stored in the live directory;

update, when the elapsed time has not passed the threshold amount of time, a time playlist by appending the segment identifier of the new segment to the time playlist, wherein the time playlist includes segment identifiers of segments that span a portion of the content stream, and wherein the time playlist is stored in a directory with a timestamp corresponding to a time between a start time of the content stream and a time when the update playlist was received;

create a new playlist that includes the segment identifier of the new segment, wherein the new playlist identifies a newest segment of the content stream, wherein the new playlist is created at a time when the update playlist is received, and wherein the new playlist is stored in a directory with a timestamp corresponding to a time when the update playlist was received;

receive a request, from the client device, for a playlist;

determine that whether the request is a first request of a session for the content stream;

in response to determining that the request is the first request of the session for the content stream, select, as a selected directory and in response to determining that the request is the first request of the session for the content stream, a directory, of the plurality of directories, with a timestamp that reflects identifies a time of the first request; provide the first playlist from the selected directory;

receive a subsequent request, from the client device, for a playlist file;

determine that the subsequent request is not the first request of the session for the content stream;

in response to determining that the subsequent request is not the first request of the session for the content stream, determine, in response to determining that the request is not the first request of the session, whether that an amount of time since the first request is less greater than the threshold amount of time;

in response to determining that the amount of time since the first request is less than the threshold amount of time, select, as the selected directory and in response to determining that the amount of time since the first request is less than the threshold, the same directory with the timestamp that reflects identifies the time of the first request;

provide the playlist file from the selected same directory;

receive another subsequent request, from the client device, for a playlist file;

determine that the another subsequent request is not the first request of the session for the content stream;

in response to determining that the another subsequent request is not the first request of the session for the content stream, determine that the amount of time since the first request is greater than the threshold amount of time;

in response to determining that the amount of time since the first request is greater than the threshold amount of time, select, as the selected directory and in response to determining that the amount of time since the first request is not less than the threshold, the live directory; and send, to the client device, a provide the playlist file from the selected live directory.

\* \* \* \* \*